A. PETTENGILL, Jr.
STAVE MACHINE.
No. 35,948. Patented July 22, 1862.
Fig. 1.
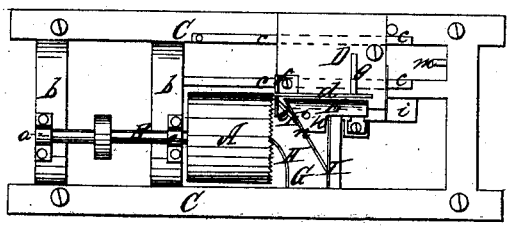
Fig. 4.
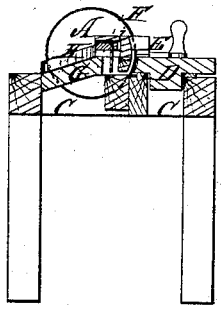
Fig. 2.
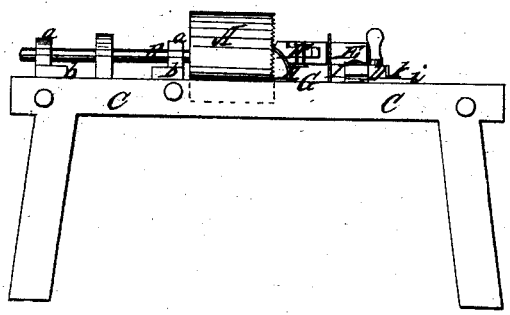
Fig. 5.
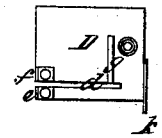
Fig. 6.
Fig. 3.
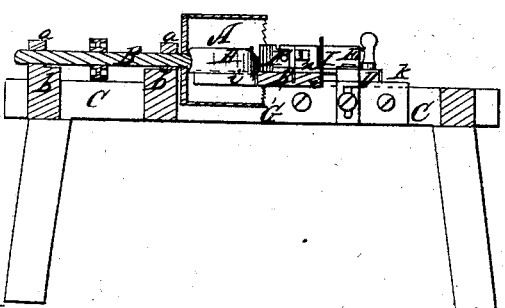
Fig. 7.
Witnesses:
Inventor:
Asa Pettengill Jr.

UNITED STATES PATENT OFFICE.

ASA PETTENGILL, JR., OF PETERBOROUGH, NEW HAMPSHIRE.

IMPROVEMENT IN STAVE-MACHINES.

Specification forming part of Letters Patent No. 35,948, dated July 22, 1862.

*To all whom it may concern:*

Be it known that I, ASA PETTENGILL, Jr., of Peterborough, in the county of Hillsborough and State of New Hampshire, have invented an Improved Machine for Sawing a Block of Wood into Staves; and I do hereby declare the same to be fully described in the following specification, and illustrated in the accompanying drawings, of which—

Figure 1 is a top view of such machine; Fig. 2, a front elevation of it; Fig. 3, a longitudinal section taken through the shaft of the rotary saw, and exhibiting the switch and various other parts, to be hereinafter described. Fig. 4 is a transverse section taken through the discharging-chute. Fig. 5 is a top view of the carriage of the machine. Fig. 6 is a horizontal section of the guide E and the switch F. Fig. 7 is a side view of the switch.

In the drawings, A denotes a tubular or cylindrical saw fixed to the inner end of a shaft, B, which is supported in bearings $a$ $a$, resting on the transverse bars $b$ $b$ of a frame, C. A carriage or platform, D, is arranged on parallel ways or guides $c$ $c$, which are disposed on the frame C and with respect to the saw, as shown in the drawings, the said carriage being constructed with a long slit or opening, $d$, for reception of the saw during the advancement of the carriage on its ways. Furthermore, the carriage has three abutments, $e$, $f$, and $g$, elevated above its upper surface and arranged with reference to the said slot $d$, as shown in Figs. 1, 2, 3, and 5.

A stationary or adjustable guide, E, upheld by the frame C, is disposed with respect to the saw and the carriage, as exhibited in the figures, and carries at its end which is next to the saw a movable lever or switch, F, whose fulcrum is exhibited at $h$. Furthermore, an arm or rail, $i$, extends from the frame C and into the interior of the saw, and is arranged so as to be on a level with and alongside of the carriage D while the latter may be moving forward or entering the saw. From the said arm an inclined chute, G, extends laterally, and has a curved guide, H, where it projects into the saw. Such chute may also be provided with another guide, I, applied to its opposite edge.

From the rear end of the carriage D a stud, $k$, extends laterally, and is carried against a pin, $l$, projecting from the tail of the switch at the proper period while the carriage is being advanced.

The operation of the machine may be thus described. If we suppose the saw to be in revolution, the carriage D to be drawn backward until its rear end may be against a stop, $m$, and that a block of wood is placed on such carriage and between the abutments $e$, $f$, and $g$, and with one side of the block close against the vertical guiding-face of the guide E, the machine will be ready for sawing a stave from such block. Next, under such circumstances, if we move the carriage in a direction toward the saw, the block will be carried into contact with the switch, and will move it aside and pass against the saw, which, being in revolution, will cut into the block, and during the continued movement of the carriage will separate a portion or stave from such block, the portion so separated being within the saw and resting on that part of the carriage which may be therein. Immediately after the saw may have so passed entirely through the block from one end of it to the other, the stud $k$ will be moved against the pin $l$ of the switch, and so as to create a lateral movement of the latter, such as will cause it to stand directly in rear of the separated stave and in range with the beveled or deflecting front end or part $n$ of the guide E. While the carriage may be in the act of being retracted the abutment $e$ will force the stave backward and against the switch, which will deflect the stave laterally, so as to cause it to descend the chute and be discharged from the machine. The curved guide H in the meantime will operate to prevent the stave from falling down upon the lower part of the interior of the space within the saw.

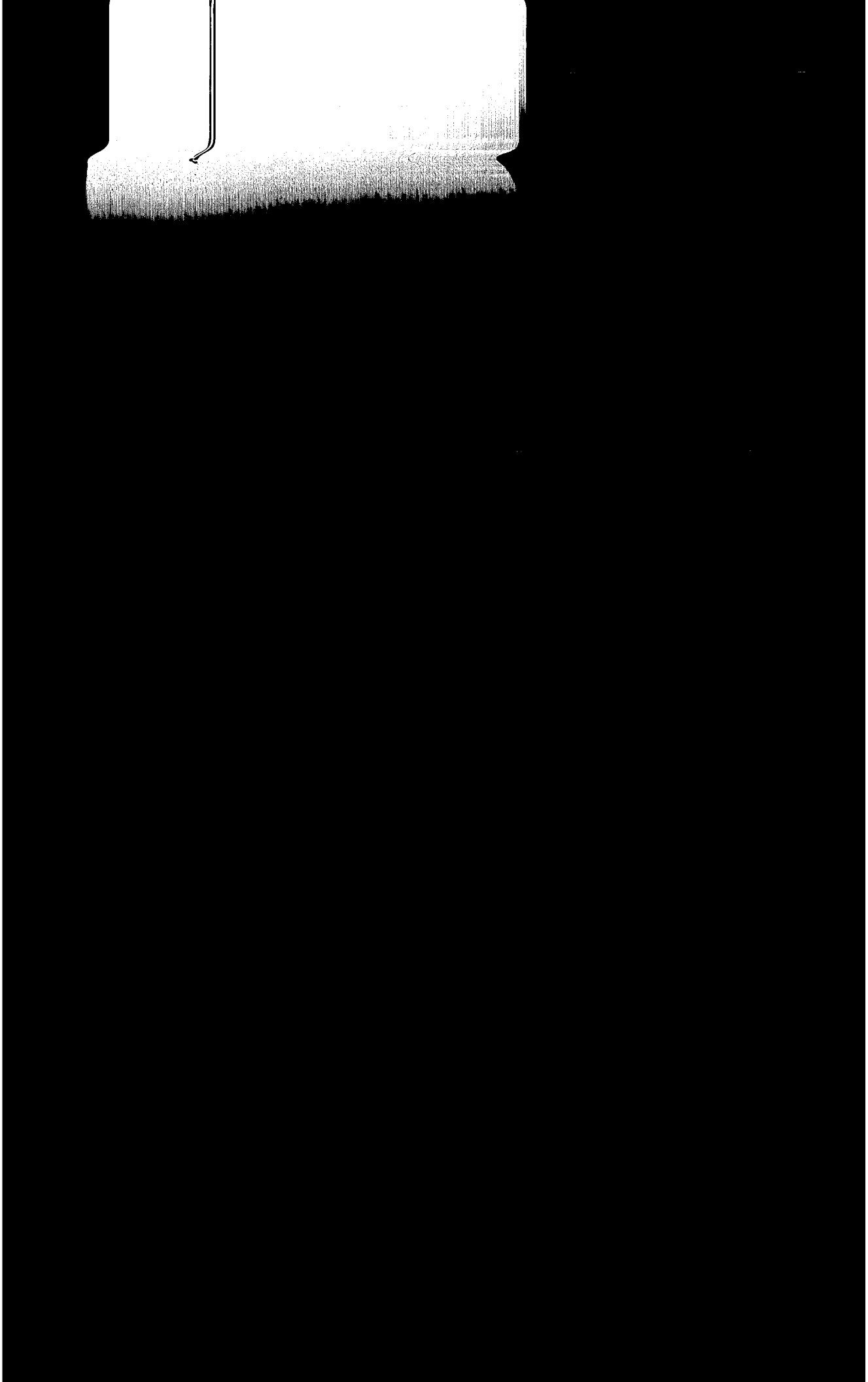

In ordinary stave-sawing machines the stave while the carriage is being retracted will be brought back with and upon the carriage, and has to be removed therefrom by manual labor before the block can be so brought up against the guide as to be in a proper position for another stave to be separated from it; but by means of the switch applied to the guide and operated by the block and the carriage, substantially as specified, each stave while being